(12) United States Patent
Wilkings et al.

(10) Patent No.: US 7,108,109 B1
(45) Date of Patent: Sep. 19, 2006

(54) MONO-BLOC BRAKE CALIPER AND EVAPORABLE PATTERN FOR CASTING SAME

(76) Inventors: Scott Wilkings, 3345 Lathenview Ct., Alpharetta, GA (US) 30004; Koepp Douglas Petrykowski, 13906 Point Lookout Rd., Charlotte, NC (US) 28278

( * ) Notice: Subject to any disclaimer, the term of this patent is extended or adjusted under 35 U.S.C. 154(b) by 114 days.

(21) Appl. No.: 10/670,404

(22) Filed: Sep. 25, 2003

(51) Int. Cl.
*F16D 65/00* (2006.01)
(52) U.S. Cl. ..................... 188/73.1; 188/72.4
(58) Field of Classification Search .............. 188/70 R, 188/71.1, 72.4, 72.5, 73.1, 73.47
See application file for complete search history.

(56) References Cited

U.S. PATENT DOCUMENTS

| | | | |
|---|---|---|---|
| 2,830,343 | A | 4/1958 | Shroyer |
| 4,093,043 | A | 6/1978 | Smith |
| 4,494,630 | A | 1/1985 | Stoka et al. |
| 4,777,997 | A | 10/1988 | Corbett |
| 4,802,447 | A | 2/1989 | Corbett |
| 4,867,280 | A | 9/1989 | Von Gruenberg et al. |
| 4,947,923 | A | 8/1990 | Rikker |
| 5,080,955 | A | 1/1992 | VanRens |
| 5,372,176 | A | 12/1994 | Brown et al. |
| 5,515,948 | A | 5/1996 | Gilliland |
| 6,227,333 | B1 | 5/2001 | Scheib et al. |
| 6,260,670 | B1 | 7/2001 | Maehara |
| 6,367,595 | B1 | 4/2002 | Mori et al. |

*Primary Examiner*—Len Tran
(74) *Attorney, Agent, or Firm*—Neil F. Markva

(57) ABSTRACT

An evaporable foam pattern assembly for use in a process of casting a one-piece article in a mold filled with flowable particulate molding material. A first foam pattern section includes a first recess pattern portion and an adhesive surface pattern adapted to be joined to an adhesive surface pattern of a second foam pattern section having a second recess pattern portion that is registered with the first recess pattern portion to define the article when the adhesive surface patterns of the first and second foam pattern sections are adheringly joined. The registered first and second recess pattern portions define an outer shaped surface pattern of the article, and an inner shaped surface pattern of the article. An inlet end section of a tubular passageway cavity pattern forms a fluid flow path from the inner shaped surface pattern through an outlet end section of the tubular passageway cavity pattern that extends openly and outwardly through the outer shaped surface pattern. A structural configuration at the inlet end section is effective to enhance movement of particulate molding material into the passageway cavity pattern during the casting process to form a passageway fluid connection section within the article. Molten material poured into the mold evaporates and replaces the evaporable pattern assembly to produce the article. The invention more specifically produces a novel one-piece brake caliper casting having a cast-in tubular passageway having an inner surface diameter of less than about 6.0 mm. The unique casting design minimizes the time required to machine and assembly the finished disc brake caliper of the invention.

19 Claims, 5 Drawing Sheets

MONO-BLOC BRAKE CALIPER AND EVAPORABLE PATTERN FOR CASTING SAME

FIELDS OF THE INVENTION

This invention relates to a disc brake caliper for a disc brake assembly for use in various kinds of vehicles including cars, trucks, all-terrain-vehicles (ATV), motorcycles, and bicycles, and a method of making the caliper. More particularly, the invention relates to a one-piece brake caliper having internal passageways for supplying brake fluid to piston members for controlling a rotating disc member, and an evaporable pattern for casting a one-piece caliper housing.

DESCRIPTION OF THE PRIOR ART

When a driver applies pressure to the brake pedal to decelerate a vehicle, fluid moves through passageways and transfer ports of a disc brake into brake cylinders of a caliper housing and causes pistons to move friction pads against a disc brake rotor to slow its rotation to a stop if desired. A firm responding brake pedal is deemed more desirable in response to the driver's applied pressure. This is especially true for race car drivers. Fluid compressibility in the disc brake increases with larger amounts of fluid and at higher fluid temperatures thus decreasing pedal firmness and movement. So the invented disc brake and novel production techniques provide for optimum fluid compressibility within the brake assembly to gain the most desirable brake pedal firmness and movement.

Fundamental problems exist, however, when producing a cast brake caliper having a cast-in tubular fluid passageway having an internal diameter of a size sufficiently small to optimize use of the compressibility of the brake fluid to produce the desired brake pedal firmness and movement. Moreover, the structural configuration of the caliper casting must be designed to minimize time spent handling the casting during the drilling and machining operations for producing a finished part. An evaporable casting pattern is needed to address both of these problems simultaneously.

U.S. Pat. No. 5,515,948 discloses a racing brake caliper assembly having multiple caliper sections bolted together to form inner hydraulic fluid passageways on opposed sides of the piston cylinders that provide enhanced pressure equalization in both caliper sections. The cylinders are located on opposite sides of a friction pad chamber in which friction pads are disposed to move against the rotating brake rotor. With each additional separate caliper segment, the possibility of movement that will damage the integrity of the disclosed caliper assembly increases.

U.S. Pat. No. 6,260,670 discloses an opposed piston type disc brake having two caliper sections bolted together and includes an exterior tubular cross-over fluid transport passageway. The design of this assembly involves several different manufacturing and handling cost factors that are obviated by the mono-bloc disc brake caliper and novel evaporable casting pattern of the invention.

One-piece disc brake castings are known to eliminate the problems associated with bolting separate casting segments together to produce disc brake calipers. Such mono-bloc calipers are also known to provide structural integrity to a disc brake assembly particularly when using aluminum alloy castings. U.S. Pat. No. 6,367,595 discloses a mono-bloc caliper having symmetrically disposed hydraulic fluid passageways on opposed sides of piston cylinders. Handling of the casting in the finishing operation is not minimized, however. For fluid transport passageways are drilled from different directions to require excessive handling to produce the finished cast brake caliper.

U.S. Pat. Nos. 4,093,043; 4,494,630; and 4,867,280 each discloses a one-piece caliper housing having an internal fluid passageway. The manner of forming the disclosed housing is not explained in these patents. The disposition of the various passageways, however, indicated that they are drilled. So any particular problem associated with an evaporable casting pattern for making these known devices is not disclosed nor is there any disclosure of how to overcome the problems that are solved by the invented brake caliper design and evaporable pattern process of the invention.

Casting processes using lost foam as in the current invention are known as found in U.S. Pat. No. 2,830,343, which discloses a casting method without a mold cavity wherein a polystyrene foam pattern is embedded in sand. The foam pattern left in the sand evaporates when molten metal is poured into the foam pattern. The molten metal replaces the foam pattern thereby precisely duplicating all features of the pattern. U.S. Pat. No. 4,947,923 is incorporated by reference herein in its entirety and discloses the historical development of the evaporable pattern casting process.

The known lost-foam process includes the following basic steps. First a foam pattern and gating system is made using some sort of mold. Secondly, the mold or foam pattern and gating system are usually assembled into a cluster of individual parts to facilitate large volume production. The cluster is then coated with a porous ceramic/refractory coating. The prepared cluster is then placed into loose unbonded particulate material such as sand that is packed around the foam cluster by vibrating the entire mold assembly. Molten metal poured directly into the cluster evaporates the foam, and the foam vapor disperses in the interstices of the sand with the metal replacing the foam. When solidified, the metal cluster is removed, separated, and the individual parts are finished using well known drilling and machining methods.

The pattern includes a sprue and runner system in the particulate material for pouring the metal into the mold. The sprue typically stands higher than the high point of the mold to provide a metallostatic head of metal sufficient to cause the metal to readily flow into the mold and completely displace the evaporable pattern therein. A metallostatic pressure head of at least about 1 psi when the sprue is about 10 inches higher than the high point of the mold which is typical for a pattern made of expanded polystyrene. Other evaporable materials useful as patterns for this process include polymethyl methacrylate and polyalkylene carbonate. Typically, porous protective refractory coatings on the pattern comprise silica, mica, and clay binders and serve to improve pattern stiffness, prevent sand erosion, improve casting surface finish, and aid in release of gas and liquid products from foam pyrolysis. The coatings may be applied by spraying or dipping.

U.S. Pat. No. 5,080,955 discloses an evaporable foam pattern assembly of the general type used in this invention. U.S. Pat. Nos. 4,777,997; 4,802,447; 5,372,176; and 6,227,333 each disclose various foam pattern devices that produce internal passageways for engine blocks and transmission housings. However, none of these patents or anyone else in the lost-foam casting field recognizes a problem in producing a one-piece article casting having an internal tubular passageway with a diameter of less than about 6.0 mm, and more specifically within the range of from about 4.0 mm to about 6.0 mm. A disc brake caliper requires such a small passageway to achieve the desired brake pedal firmness and movement as discussed above. Gaining free flow of particulate material from an inner cylindrical cavity section into a passageway section of an evaporable pattern during the casting process is not a recognized problem. For without such free particulate flow a substantially completely filled small diameter passageway cannot be obtained with known pattern forming techniques. And without a compacted particulate material, the cast-in passageway cannot be formed in the mono-bloc casting.

PURPOSE OF THE INVENTION

A primary object of the invention is to provide a one-piece caliper housing having a cast-in tubular passageway for carrying hydraulic brake fluid from a master cylinder source into a piston cylinder of a disc brake to achieve the most desirable brake pedal firmness and movement.

Another primary object of the invention is to provide a novel casting pattern that enhances the free flow of particulate material from an inner cylindrical cavity to substantially completely fill a small diameter passageway pattern section.

A further object of the invention is to provide an integral, one-piece brake caliper casting that requires minimum handling to effect the drilling and machining operations for producing the invented brake caliper at a cost well below the cost of producing existing products of its kind.

A still further object of the invention is to provide a one-piece brake caliper casting having a cast-in fluid transport passageway with a diameter of less than about 6.0 mm, and more specifically within the range of from about 4.0 mm to about 6.0 mm with an average diameter of about 4.5 mm.

Another object of the invention is to provide an evaporable pattern, which mimics the outer and inner shaped surfaces of a disc brake caliper casting having cast-in fluid transport cross-over passageways each openly connected to opposed sides of an inner cylindrical surface.

Still another object of the invention is to provide an evaporable pattern with a cross-over fluid transport passageway section having a fluid outlet end segment that openly extends from bridge passageway sections at opposed ends of the caliper housing to form fluid outlet end sections that open outwardly through the outer shaped surface of the casting.

SUMMARY OF THE INVENTION

Mono-Bloc Brake Caliper

The invented disc brake caliper comprises a front section, a rear section, and two bridge sections each disposed at an outer end of said front and rear sections, and extending between said front and rear sections. The front, rear, and bridge sections form a one-piece cast configuration to integrally define housing means including an outer shaped surface and an inner shaped surface with each front, rear, and bridge section including inwardly facing surfaces that define a friction brake pad support zone therebetween. Each front and rear section includes a closed piston cylinder and a piston member movably disposed within each piston cylinder, and first and second cast-in tubular passageway means for defining a continuous fluid flow path through each said bridge section from passageway inner ends of inner end portions that are openly connected to opposing sides of the piston cylinders in the front and rear sections. And fluid connection means extends through at least one of the front and rear sections to be in open fluid flow contact with said tubular passageway means in each said bridge section.

More specifically, the piston members are movably disposed along a common longitudinal center axis, and the fluid connection means includes fluid outlet end portions having a longitudinal axis that extends along each bridge section and is parallel to the longitudinal center axis of the piston members. The first and second cast-in tubular passageway means includes fluid outlet end portions having fluid inlet and outlet ports with a tubular fitting for directing and bleeding fluid through the passageway means. The cast-in tubular passageway means includes an inner shaped surface having a diameter of less than about 6.0 mm in the range of from about 4.0 mm to about 6.0 mm. In a specific embodiment, the average size of the inner shaped surface diameter of the tubular passageway means is about 4.5 mm. The first and second cast-in tubular passageway means have substantially identical inner shaped surfaces that include a substantially U-shaped portion. The passageway means are symmetrically located with respect to each other on opposed sides of each piston cylinder, and each includes a fluid outlet end portion that is substantially straight with one end thereof openly connected to each said U-shaped portion and the other end thereof opening outwardly through the outer shaped surface of the housing means. In this embodiment, the closed piston cylinders are longitudinally spaced with respect to each other along a single longitudinal center axis. And each inner end portion is located along a respective plane that includes one of the bridge sections with each respective plane being disposed in a direction that is parallel to the longitudinal center axis whereby the respective planes intersect each other along a line that is parallel to the longitudinal center axis of the piston members.

The disc brake caliper casting of the invention from which the invented disc brake caliper is manufactured comprises caliper housing means including a front section, a rear section, and a bridge section extending between the front and rear sections. The front, rear, and bridge sections form a cast one-piece structural configuration to integrally define an outer shaped surface and an inner shaped surface. The inner shaped surface includes at least one inner cylindrical surface, first cast-in passageway means disposed on a first side of the cylindrical surface, and second cast-in passageway means disposed on an opposed second side of the cylindrical surface. Each cast-in passageway means includes a cylinder connecting section that is outwardly directed from the inner cylindrical surface, and has an inner end portion that openly connects to the opposed sides of the cylindrical surface and an outer end portion that extends to the bridge section. Means for forming a fluid connection section intersects the cylinder connecting sections to produce a continuous fluid flow path between the front section and rear section, and includes a bridge portion that extends through the bridge section to intersect each cylinder connecting section. The fluid connection section forming means includes an outlet end segment that extends outwardly from the bridge section through an outlet opening in the outer shaped surface. In one embodiment, the fluid connection passageway portion is cast-in and extends outwardly from each outer end portion of the cylinder connecting sections across the bridge section and opens outwardly from the outlet end segment.

In another embodiment, the bridge section includes two bridge end portions each disposed at an outer end of the front and rear sections with the front, rear, and bridge sections each including an inwardly facing surface that together define a friction brake pad support chamber having torque bearing surfaces that are disposed at opposing ends of the support chamber and are perpendicular to the inwardly facing surfaces of the front and rear sections. The torque bearing surfaces include disc rotor grooves having a structural configuration that is effective to allow brake disc rotor means to rotate through the friction brake pad support chamber when a brake caliper that is produced from the caliper casting is mounted to a vehicle. The front and rear sections each includes an inner cylindrical surface and an inwardly directed cast-in cylinder connecting section on opposing sides of each inner cylindrical surface. The inner cylindrical surfaces are disposed along a single longitudinal center axis that extends through the front and rear sections, and through the friction brake pad support chamber. And the two bridge end portions each includes a cast-in fluid connection section extending therethrough with each end thereof intersecting a cast-in cylinder connecting section.

Another feature of the invention is directed to front, rear, and bridge sections wherein each includes an inwardly facing surface that together define a friction brake pad support zone having a structural configuration effective to allow brake disc rotor means to rotate between friction brake pads mounted in the support zone when a brake caliper that is produced from the caliper casting is mounted to a vehicle. The fluid connection section forming means includes a cast-in fluid connection passageway portion that extends outwardly from each outer end portion of the cylinder connecting sections and then extends across the bridge section and opens outwardly from the outlet end segment. The inner cylindrical surface is disposed in the rear section and has a longitudinal center axis that extends from the rear section and through the friction brake pad support zone with the front section including a front opening which is registered with the inner cylindrical surface and longitudinal center axis. The outlet end segment includes an outlet opening having a longitudinal axis that is parallel to the longitudinal center axis of the inner cylindrical surface whereby any machining may be effected on one side of the casting within the inner cylindrical surface in the rear section, within the registered front opening, and along the longitudinal axis of and within the outlet opening.

A further feature of the caliper casting of the invention is directed to an inner shaped surface that includes a pair of inner cylindrical surfaces and each first and second cast-in passageway means includes a fluid connection section outwardly directed from each inner cylindrical surface with an outlet end that extends openly and outwardly through the outer shaped surface. Each cast-in passageway means includes two opposing inwardly directed cylinder connection sections having inner ends that each openly connect to said pair of inner cylindrical surfaces so that the cast-in passageway means is effective to form a continuous fluid flow crossover path from a first open outlet side to a second closed side of the outer shaped surface whereby the path extends through the outlet end of each passageway means, and through the inner ends that openly connect to each cylindrical surface.

In another feature of the invented caliper casting, the bridge section includes two bridge end portions each disposed at an outer end of the front and rear sections wherein the front, rear, and bridge sections each includes an inwardly facing surface that together define a friction brake pad support a chamber around the support zone. Torque bearing surfaces are disposed at opposing ends of the support chamber, are perpendicular to the inwardly facing surfaces of the front and rear sections, and include disc rotor grooves having a structural configuration that is effective to allow brake disc rotor means to rotate through the friction brake pad support chamber when a brake caliper that is produced from the caliper casting is mounted to a vehicle.

The front and rear sections each includes an inner cylindrical surface and an inwardly directed cast-in cylinder connecting section located on opposing sides of each inner cylindrical surface. And the two bridge end portions each includes a cast-in fluid connection section extending therethrough with each end thereof intersecting a cast-in cylinder connecting section to produce a fluid flow path. The outer shaped surface includes friction pad support means for mounting friction brake pad supports within the support chamber, and caliper support means for mounting a machined brake caliper cast housing to a vehicle. The friction pad support means and caliper support means each includes a bore opening having a longitudinal axis that is parallel to the longitudinal center axis of the inner cylindrical surface. The torque bearing surfaces are tapered inwardly and downwardly from a respective bridge end portion with a structural configuration which conforms to the shape of tapered friction brake pad members used in disc brake calipers.

Another feature of the invented disc brake caliper casting comprises caliper housing means including a front section, a rear section, and a bridge section extending between the front and rear sections with the front, rear, and bridge sections having a cast one-piece structural configuration to integrally define an outer shaped surface and an inner shaped surface. The front, rear, and bridge sections each includes an inwardly facing surface that together define a friction brake pad support zone for disposing friction brake pad means on opposing sides of disc brake rotor means. The casting has friction pad support means for mounting the friction brake pad means within the brake pad support zone. The inner shaped surface includes at least one inner cylindrical surface having a longitudinal center axis, first cast-in passageway means disposed on a first side of the cylindrical surface, and second cast-in passageway means disposed on an opposed second side of the cylindrical surface.

More specifically, each passageway means includes a cylinder connecting section being outwardly directed from the inner cylindrical surface, and having an inner end portion that openly connects to an opposed side of the cylindrical surface, and an outer end portion that extends to the bridge section. The outer shaped surface includes a plurality of drilling surfaces each disposed in a respective plane that extends in a direction perpendicular to the longitudinal center axis of the inner cylindrical surface, and caliper support means for mounting a finished brake caliper produced from the brake caliper casting. The bridge section includes a drilling surface so that the bridge section may be drilled into for forming a fluid outlet end portion that connects with a cross-over fluid flow path that extends through the passageway means and inner cylindrical surface. And the caliper support means includes a drilling surface so that the outer shaped surface may be drilled into for forming bore openings to mount the finished brake caliper to a vehicle. When located on the outer shaped surface, the friction pad support means includes a drilling surface so that the outer shaped surface may be drilled into for forming a bore opening to mount said friction brake pad means in said brake pad support zone.

In a more particular feature of the invented caliper casting, the inner shaped surface includes a pair of inner cylindrical surfaces, and a fluid connection section is outwardly directed from each inner cylindrical surface, and the fluid outlet end portion extends openly and outwardly through the outer shaped surface. Two opposing inwardly directed cylinder connection sections have inner ends that each openly connect to the pair of inner cylindrical surfaces whereby the first and second cast-in passageway means are effective to form a continuous fluid flow crossover path from a first open outlet side to a second closed side of the outer shaped surface so that the path extends through the outlet end of each passageway means, and through the inner ends that openly connect to each cylindrical surface.

In a specific embodiment, the bridge section of the invented caliper casting includes two bridge end portions each disposed at an outer end of the front and rear sections. The front, rear, and bridge sections each includes an inwardly facing surface that together define a friction brake pad support chamber having torque bearing surfaces that are disposed at opposing ends of the support chamber and are perpendicular to the inwardly facing surfaces of the front and rear sections. The torque bearing surfaces include disc rotor grooves having a structural configuration that is effective to allow brake disc rotor means to rotate through the friction brake pad support chamber when a brake caliper that is produced from the caliper casting is mounted to a vehicle. The front and rear sections each includes an inner cylindrical surface and inwardly directed cast-in cylinder connecting sections located on opposing sides of each inner cylindrical surface. Each bridge end portion includes a cast-in fluid connection section extending therethrough with each end thereof intersecting a cast-in cylinder connecting section. And the inner cylindrical surfaces are disposed along a single longitudinal center axis that extends through the front and rear sections, and through the friction brake pad support chamber whereby the inner cylindrical surfaces may be machined to form finished brake piston cylinders from the same side of said casting as the drilling surfaces are drilled into.

Evaporable Pattern for Casting a Mono-Bloc Article

The invented evaporable foam pattern assembly is for use in a process of casting a one-piece article in a mold filled with flowable particulate molding material. The assembly comprises a first foam pattern section including a first recess pattern portion and an adhesive surface pattern adapted to be joined to an adhesive surface pattern of a second foam pattern section having a second recess pattern portion that is registered with said first recess pattern portion. The registered first and second recess pattern portions define the article when the adhesive surface patterns of the foam pattern sections are adheringly joined. That is, the registered first and second recess pattern portions define an outer shaped surface pattern of the article, and an inner shaped surface pattern of the article that is connected to an inlet end section of a tubular passageway cavity pattern that forms a fluid flow path from the inner shaped surface through an outlet end section of the tubular passageway cavity pattern that extends openly and outwardly through the outer shaped surface pattern.

Located at the inlet end section of the tubular passageway cavity pattern are means for enhancing movement of particulate molding material from the inner shaped surface pattern into the passageway cavity pattern during the casting process to form a passageway fluid connection section within the article along the fluid flow path when molten material is poured into said mold to evaporate and replace the evaporable pattern assembly to produce said article. When the first and second foam pattern sections are joined, the outer shaped surface pattern defines a pattern body having a parting surface between the foam pattern sections that forms a parting line around the outside periphery of the outer shaped surface pattern. And the tubular passageway cavity pattern is effective to form the passageway fluid connection section which is intersected by the parting surface of the pattern body. In a specific embodiment, the means for enhancing movement of the particulate molding material includes diverging wall means that openly connects to the inner shaped surface pattern and diverges outwardly from the tubular passageway cavity pattern into the inner shaped surface pattern. So the means for enhancing movement of the particulate molding material is located at an inner end of each first and second recess pattern portion. And the passageway pattern sections are effective to form a continuous fluid flow path that extends through each passageway pattern section, the inner shaped surface pattern that includes a cylindrical surface pattern section to which the first and second passageway pattern sections are connected, and the outlet end section of the tubular passageway cavity pattern. Moreover, the passageway pattern sections are effective to receive an amount of flowable particulate molding material during the casting process that is sufficient to produce a compacted particulate mass that assumes a shape defined by the passageway pattern sections.

In a specific embodiment of the invented foam pattern assembly, the one-piece article is a brake caliper housing, and the inner shaped surface pattern includes at least two inner cylindrical surface patterns are longitudinally spaced with respect to each other along a single longitudinal center axis. The tubular passageway cavity pattern includes a first passageway cavity pattern section disposed on a first side of said cylindrical surface patterns, and second passageway cavity pattern section disposed on a second, opposed side of the cylindrical surface patterns wherein each first and second passageway cavity pattern section produces tubular passageway means enclosed within the casting after the casting process. Each passageway cavity pattern section includes an inlet end pattern portion and a fluid connection pattern portion wherein each inlet end pattern portion openly connects to each inner cylindrical surface pattern, and each fluid connection pattern portion includes an outlet end pattern section that extends openly and outwardly through the outer shaped surface. And the passageway cavity pattern sections are effective to form a continuous fluid flow path that extends through the outlet end pattern section of each passageway cavity pattern section, and through the inlet end pattern portion of each passageway cavity pattern section that openly connects to each said cylindrical surface pattern.

More specifically, the tubular passageway means of the brake caliper housing includes an inner surface, and the passageway cavity pattern sections are effective to receive an amount of flowable particulate molding material that is sufficient to produce a compacted particulate mass that assumes a shape defined by the inner surface of the tubular passageway means having a diameter of less than about 6.0 mm and is in the range of from about 4.0 mm to about 6.0 mm. In a specific embodiment, the diameter of the tubular passageway in the brake caliper housing is about 4.5 mm, and the first and second passageway cavity pattern sections each have substantially identical inner shaped surfaces that are symmetrically located with respect to each other on opposed sides of each cylindrical surface pattern. And when the first and second foam pattern sections are joined, the outer shaped surface pattern defines a pattern body having a parting surface between the foam pattern sections whereby a parting line is formed around an outside periphery of the outer shaped surface pattern, and the tubular passageway cavity pattern is intersected by the parting surface.

The passageway cavity pattern sections have substantially identical inner surface shapes that are symmetrically located with respect to each other on opposed sides of the cylindrical surface patterns. And when the foam pattern sections are viewed in elevation along the parting surface, the tubular passageway cavity pattern includes a substantially identical U-shaped portion, and each outlet end pattern section is substantially straight with one end thereof openly connected to each U-shaped portion and the other end thereof opening outwardly through the outer shaped surface pattern. The first and second passageway cavity pattern sections each includes an inner end surface pattern portion that openly connects to opposed sides of the cylindrical surface patterns, and each inlet end pattern portion is located along a respective plane of the parting surface with each respective plane being disposed in a direction that is parallel to the longitudinal center axis whereby the respective planes intersect each other along a line that is parallel to the longitudinal center axis.

More particularly, an evaporable pattern device of the invention is for producing a one-piece disc brake caliper casting having an outer shaped surface, an inner shaped surface including an inner cylindrical surface, and enclosed tubular-shaped passageway means for openly connecting the inner cylindrical surfaces to the outside of the caliper casting to define a continuous crossover fluid flow path extending from one side of the caliper casting to the other side of the caliper casting. The pattern device comprises a pattern body including an outer surface pattern that conforms to the outer shaped surface of the caliper casting, and an inner cavity pattern that conforms to the inner shaped surface of the caliper casting. The pattern body includes two pattern body sections that fit together along a parting surface between the pattern sections to form a parting line along the outer surface pattern that produces a visible line along the outer shaped surface around the outside periphery of the caliper casting. The inner cavity pattern includes a cylindrical surface pattern section, and first and second passageway pattern sections having inner surfaces openly connected to the cylindrical surface pattern section. The first and second passageway pattern sections are effective to receive an amount of flowable particulate molding material that is sufficient to produce a compacted particulate mass that assumes a shape defined by the inner surfaces of the enclosed tubular passageway means of the caliper casting when a sufficient amount of flowable particulate molding material is effective to surround the pattern body and fill the inner cavity pattern when the evaporable pattern device is disposed in mold means.

In a specific embodiment of the pattern device, the cylindrical surface pattern section includes a pair of inner cylindrical surfaces that are longitudinally spaced with respect to each other along a single longitudinal center axis. The first and second passageway pattern sections have substantially identical inner surface shapes that are symmetrically located with respect to each other on opposed sides of the cylindrical surface pattern section. Each passageway surface pattern section includes an inner end portion that openly connects to an opposed side of the cylindrical surface pattern section, so as to form a tubular-shaped passageway surface pattern which is intersected by the parting surface of the pattern body. One feature of this embodiment is directed to each passageway surface pattern sections having a fluid outlet pattern end portion that extends openly and outwardly through the outer surface pattern so that when the tubular-shaped passageway surface pattern is viewed in elevation along the parting surface, each passageway surface pattern section includes a substantially identical U-shaped portion, and each fluid outlet pattern end portion is substantially straight and has one end thereof openly connected to each U-shaped portion and the other end thereof opens outwardly through the outer surface pattern.

Another feature of the pattern device of the invention is directed to passageway surface pattern sections that each includes a fluid connection surface pattern portion having fluid outlet end openings. The cylindrical surface pattern section includes a pair of inner cylindrical surfaces that are longitudinally spaced with respect to each other along a single longitudinal center axis, and inner end surface pattern portions openly connect to opposed sides of the cylindrical surface pattern section. Each inner end surface pattern portion is located along a respective plane of the parting surface with each respective plane being disposed in a direction that is parallel to the longitudinal center axis whereby the respective planes intersect each other along a line that is parallel to the longitudinal center axis. To enhance movement of particulate molding material, the inner end surface pattern portions include tapered sidewall end sections having sidewalls that converge inwardly toward the tubular-shaped passageway means.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DETAILED DESCRIPTION OF SPECIFIC EMBODIMENTS

Figure 1:
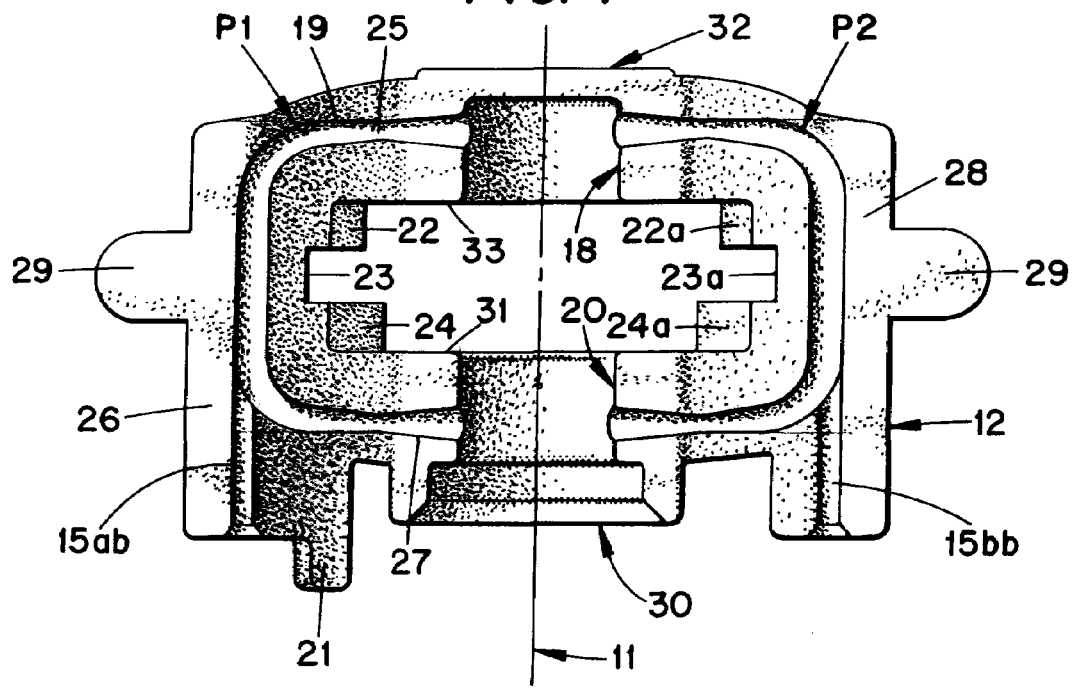
FIG. 1 is an elevational view along a parting surface of a first foam pattern section for an evaporable foam pattern assembly for casting a one-piece brake caliper housing.
Figure 2:
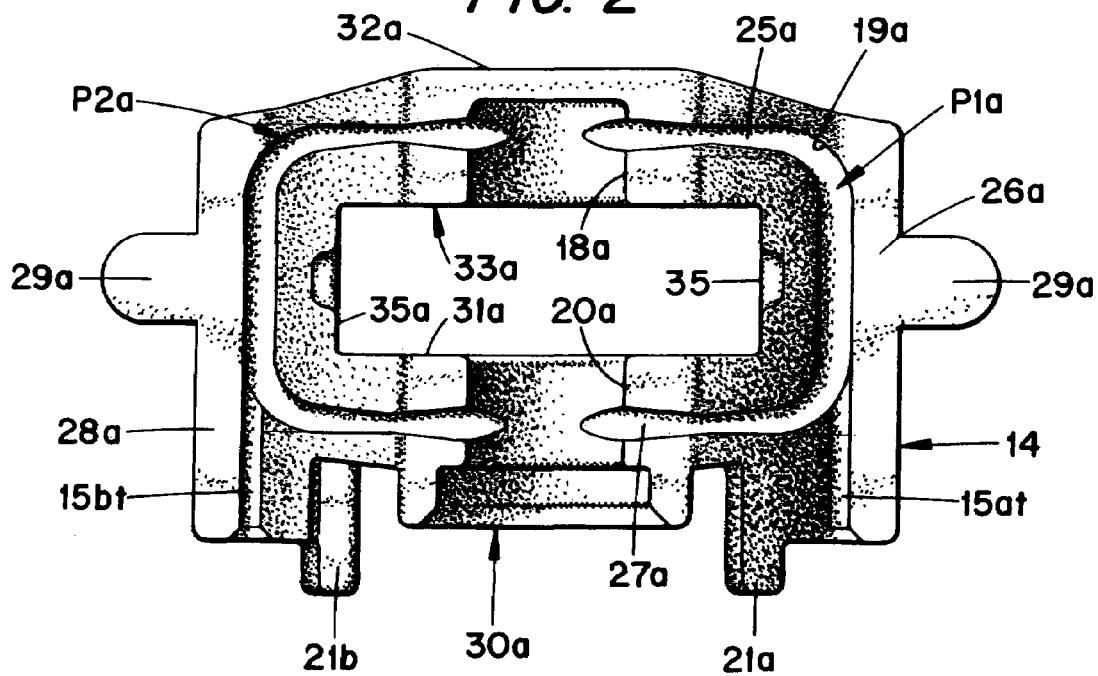
FIG. 2 is an elevational view along a parting surface of a second foam pattern section to be joined in registration with the parting surface of the first foam pattern section of FIG. 1 to produce an evaporable foam pattern assembly for casting a one-piece brake caliper housing.

Referring to FIGS. 1–4, an evaporable pattern assembly, generally designated 10, includes pattern section 12 with a recess pattern portion and an adhesive surface pattern adapted to be joined to and registered with an adhesive surface pattern and a recess pattern portion of pattern section 14. Section 12 includes cylindrical surface portions 18 and 20 connected with first and second passageway recess portions P1 and P2, and section 14 includes cylindrical surface portions 18a and 20a connected with first and second passageway recess portions P1a and P2a. When sections 12 and 14 are joined, matching recess portions P1, P1a and P2, P2a define an inner shaped surface pattern of a tubular passageway cavity pattern connected to an inner cylindrical surface formed by matching recess portions 18, 18a and 20, 20a.

Figure 3:
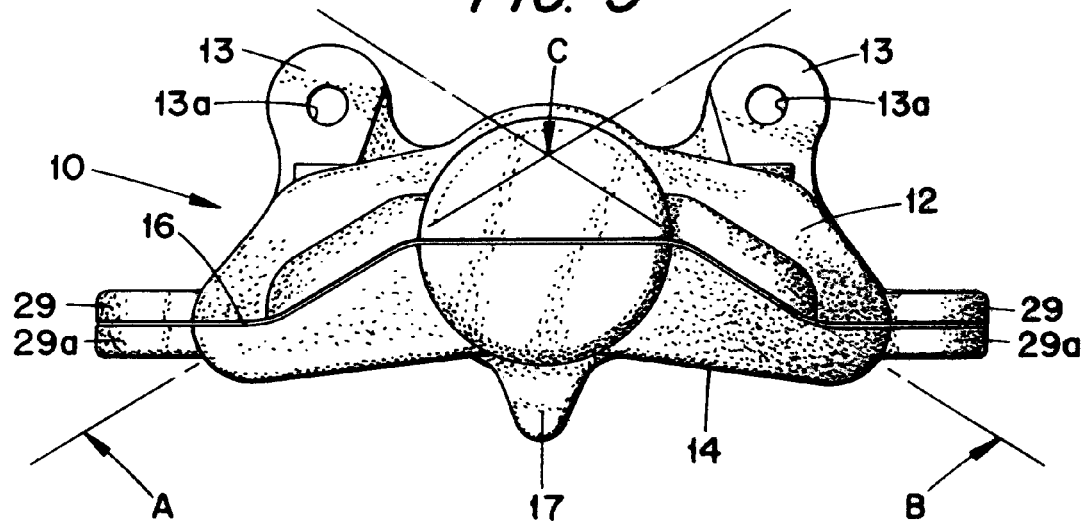
FIG. 3 is a rear elevational view of an evaporable foam pattern assembly with the first and second foam pattern sections of FIGS. 1 and 2 joined in registration for casting a one-piece brake caliper housing.
Figure 4:
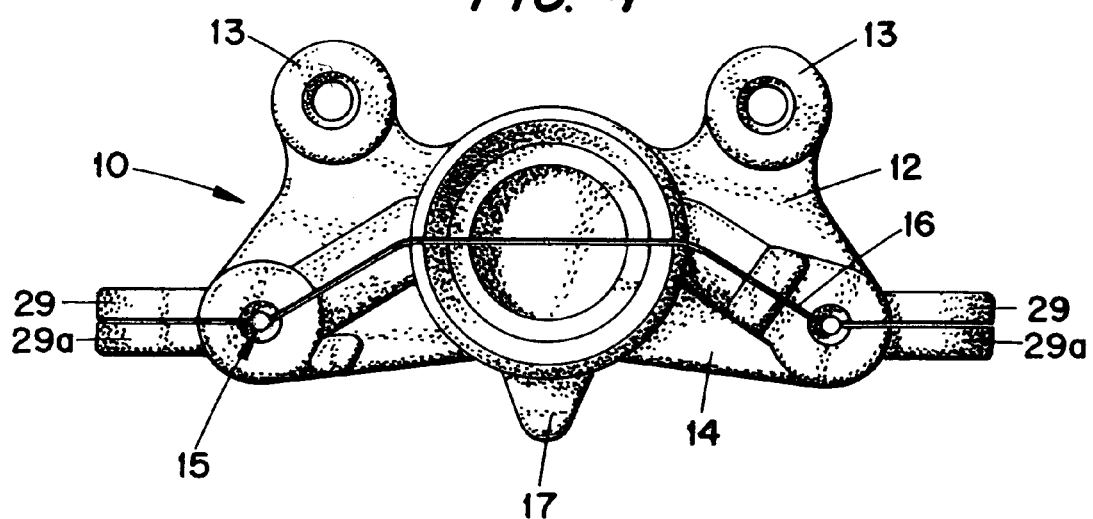
FIG. 4 is a front elevational view of an evaporable foam pattern assembly as shown in FIG. 3.
Figure 5:
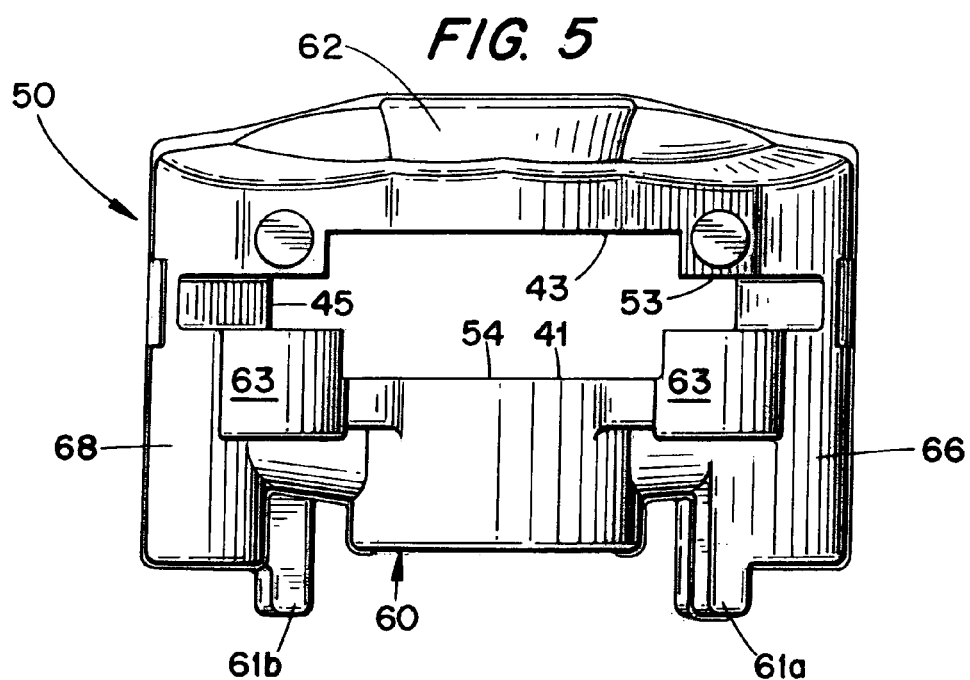
FIG. 5 is a bottom plan view of a disc brake caliper casting made in accordance with the invention.
Figure 6:
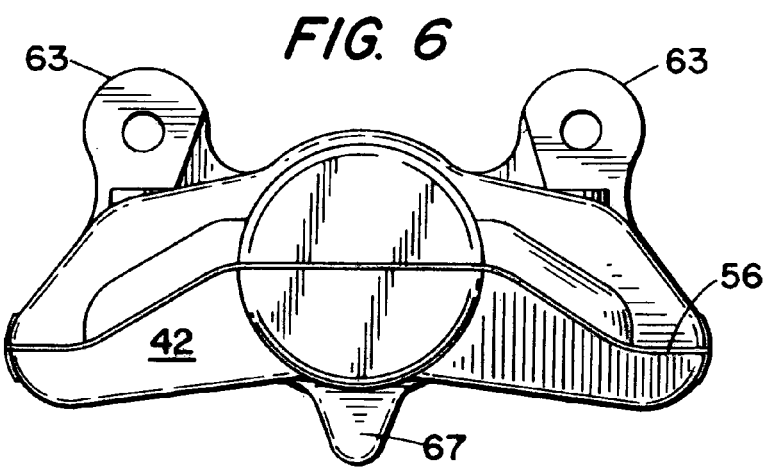
FIG. 6 is a rear elevational view of the disc brake caliper casting shown in FIG. 5.

Respective adhesive surface patterns form parting surfaces of sections 12 and 14 devoid of recess portions and define parting line 16 along the periphery of the joined assembly 10 as shown in FIGS. 3 and 4. The cylinder connecting sections of passageway cavity recess portions P1 and P2 that extend from the cylindrical are located in planes A and B which intersect along a line C that is parallel to the longitudinal center axis 11 of the pair of cylindrical surface patterns. The parting surface of the pattern assembly thus intersects the passageway cavity recess pattern so that parting line 16 traces its location within the pattern assembly and leaves a peripheral line around the caliper casting as shown in FIGS. 5–12.

The evaporable pattern assembly 10 replicates the disc brake caliper casting shown in FIGS. 5–12 with section 12 duplicating the bottom portion and section 14 the top portion of the casting. Section 12 thus includes mounting lug patterns 13 with bore opening 13a from which caliper mounting lugs 63 are formed and cast bore holes are threaded. Section 14 includes friction pad support lugs 17 that do not include bore openings so that the final holes must be drilled for mounting typical friction pad assembly for the known opposed pistion type disc brake caliper. Whether or not the openings are to be formed in the casting is a matter of choice to the manufacturer.

Pattern mold support tabs 29, 29a insure stability of the pattern assembly within the mold during the casting process and the resultant cast metal tab structures are machined off to form the finished caliper. Matching caliper vehicle mounting tabs 21, 21a and tab 21b form projections that are later machined to fit the particular vehicle mounting situation. A caliper of the invention may be mounted in either a right-hand or left-hand mounting requirement.

Casting pattern sections 12 and 14 include matching front sections 30, 30a, rear sections 32, 32a, and bridge sections 26, 26a, and 28, 28a. The front, rear, and bridge pattern sections include respective opposed facing surfaces 31, 31a; 33, 33a; and 35, 35a that duplicate a friction pad support zone within a chamber as with the casting shown in FIGS. 5–12. Casting pattern surfaces 22, 22a and 24, 24a form the torgue bearing surfaces of the caliper casting of the invention. Passageway recess portions P1 and P2 include matching U-shaped sections 19, 19a and inner inlet end sections 25, 25a and 27, 27a that openly connect to respective cylindrical surfaces 18, 18a and 20, 20a. As shown, inlet end sections 25, 25a and 27, 27a each include tapered side walls that diverge with respect to each other in a direction toward each cylindrical surface, and converge with respect to each other in a direction toward each U-shaped section 19, 19a.

Matching outlet end sections, generally designated 15 in FIG. 4, include matching bottom and top recess portions 15ab, 15at and 15bb, 15bt (second "b" for "bottom" and "t" for "top") that intersect respective U-shaped sections 19, 19a. The cast-in outlet end segments 15 are machined and threaded to receive appropriate fittings used in disc brake calipers to effectively bleed fluid (air) from and inject fluid (brake fluid) into the finished brake caliper assembly from a source such as a master cylinder in well known manner.

It is contemplated that only a portion of the U-shaped passageways might be cast-in from the cylindrical surface portions to bridge sections formed by matching recess portions 26, 26a and 28, 28a. In such an instance the recess portions used to form outlet end sections might be left out and the flat drilling surface formed at the front side of the casting could be drilled through the cast bridge sections to intersect the cast-in passageways that would extend only into the bridge section and form the desired fluid flow path in the caliper.

Figure 7:
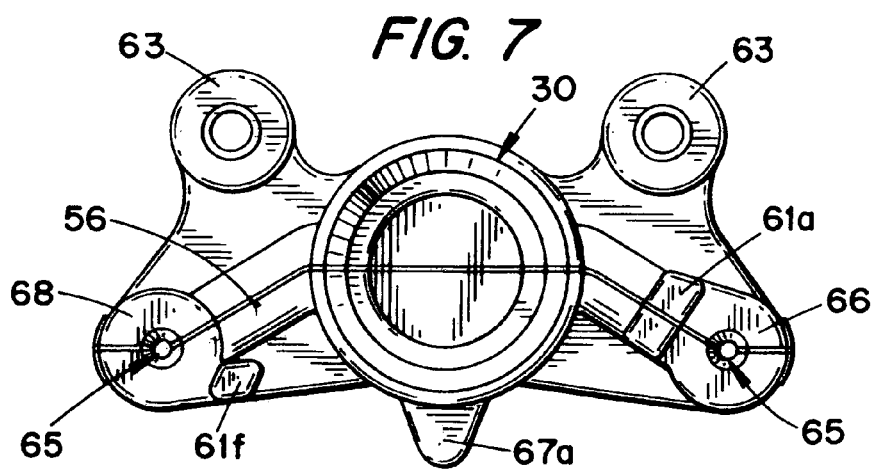
FIG. 7 is a front elevational view of the disc brake caliper casting shown in FIG. 5.
Figure 8:
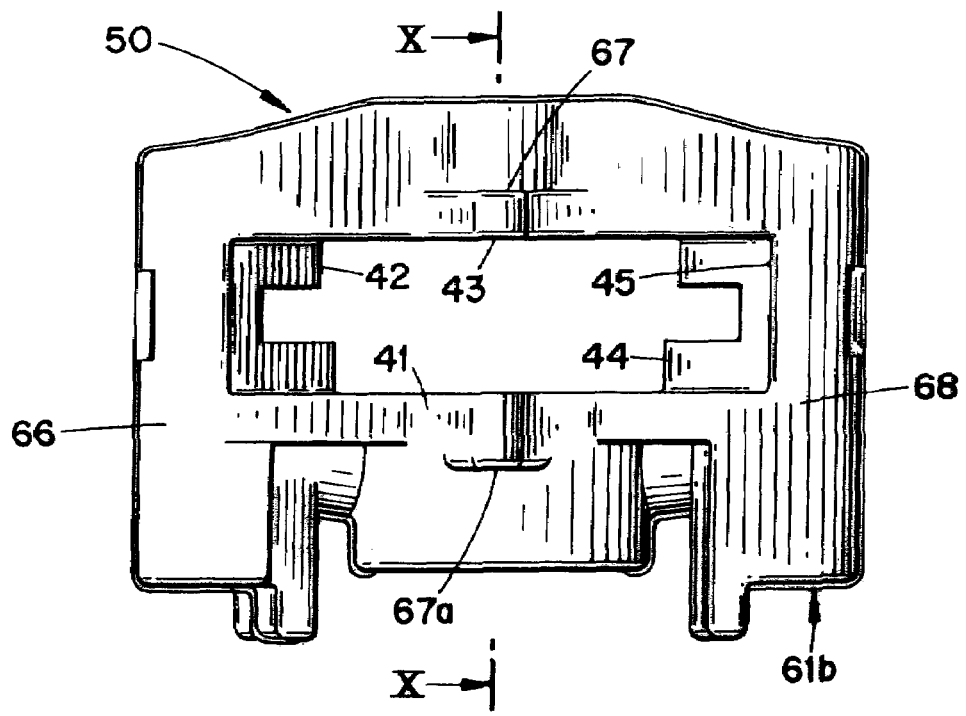
FIG. 8 is a top plan view of the disc brake caliper casting shown in FIG. 5.
Figure 9:
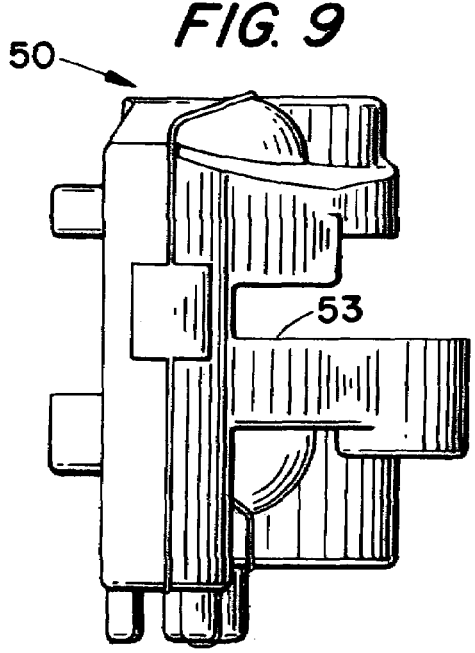
FIG. 9 is an elevational view from one end of the disc brake caliper casting shown in FIG. 5 with the top of the casting directed to the left of the drawing.

FIGS. 5–12 show disc brake caliper casting, generally designated 50, that includes front section 60, rear section 62, and bridge sections 66 and 68. Respective opposed facing surfaces 41, 43, and 45 of the front, rear, and bridge sections define a friction brake pad support zone within a brake pad chamber as shown. Rotor grooves 53 fit over the disc rotor in a known fashion and friction pad support lug 67 in rear section 42 and lug 67a in front section 60 are to be drilled for holding a rod to extend through the drilled bore holes to support a standard friction brake pad assembly within the pad support zone of the chamber. Caliper mounting lugs 63 have cast-in bore holes that require threaded drilling as do the cast-in outlet end segments 65 that require drilling only to the point of intersecting a U-shaped section of a cast-in passageway made with the invented evaporable pattern assemble tracked along the periphery of casting 50 by the cast-in parting line 56 (FIG. 7).

The cast-in cylindrical surfaces in front section 60 and rear section 62 must be machined to provide finished surfaces within which piston members are disposed to operate in the known manner within an opposed piston type disc brake caliper. A machining tool moves from front section 60 through the pad support zone and into rear section 62 along a longitudinal center axis of the cylindrical surfaces to effect the desired finishing operation. The plurality of drilling surfaces through which cast-in bore holes are threaded such as in mounting lugs 63 and outlet end segments 65 or smooth bore holes are initially formed such as in lugs 67 and 67a may all be drilled with the casting disposed in a single position. That is, each drilling surface is located in a plane that is disposed in a direction that is perpendicular to the longitudinal center axis of the cylindrical surface. With the unique disposition of the various parts in the casting, the amount of handling to effect the finishing steps to manufacture the final disc brake is minimized.

Figure 10:
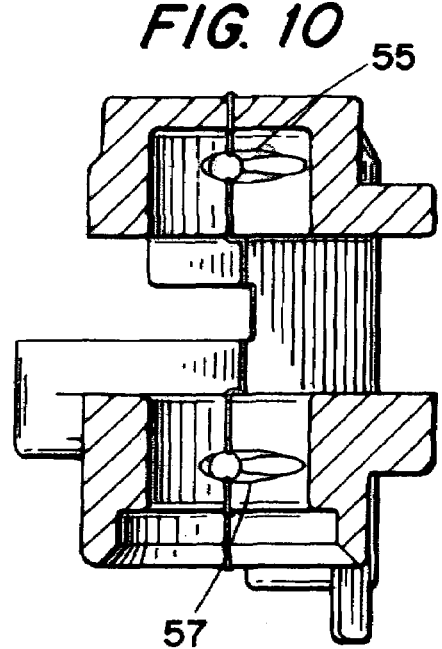
FIG. 10 is a sectional view along line X—X of the disc brake caliper casting of the invention shown in FIG. 8.
Figure 11:
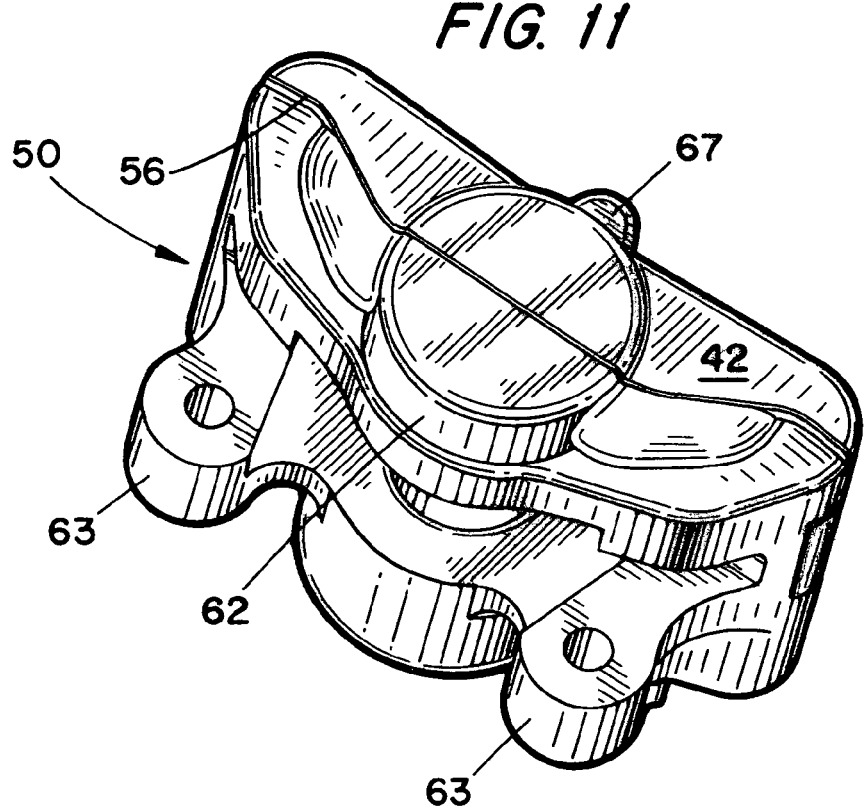
FIG. 11 is a rear perspective view of a partially finished one-piece disc brake caliper casting made in accordance with the invention.
Figure 12:
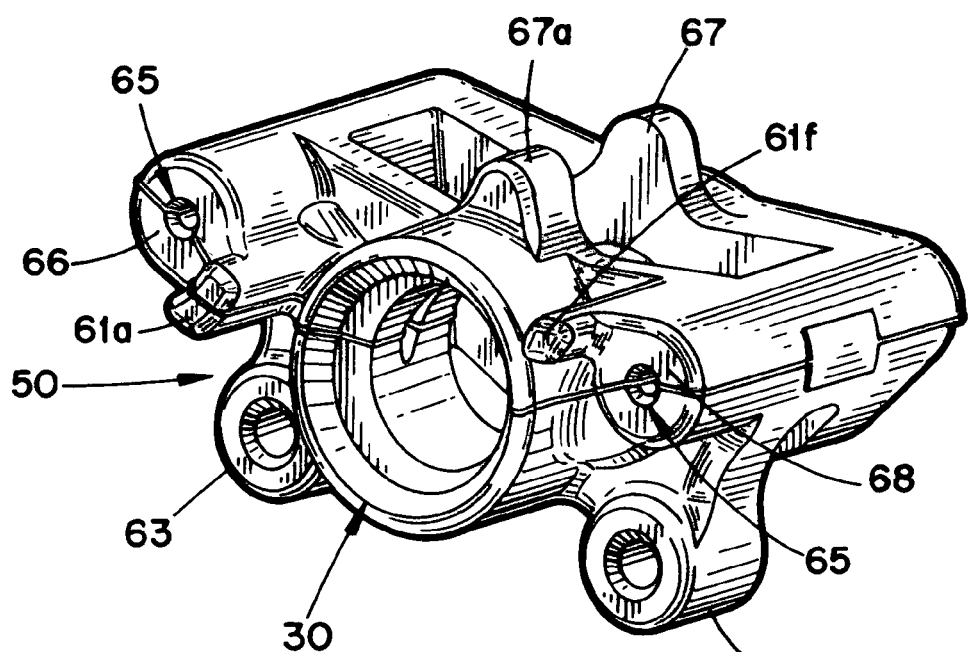
FIG. 12 is a front perspective view of the partially finished one-piece disc brake caliper casting shown in FIG. 11.

Standard aluminum alloys may be used to produce the invented casting which includes a unique cast-in fluid passageway. FIG. 10 shows the shape of the opening and inner end section 55 of the passageway with cast-in tapered sidewalls that extend from the cylindrical surface inwardly toward a cast-in tubular passageway. In this specific embodiment, the resultant diameter of the inner surface of the passageway is within the range of about 4.0 mm to about 6.0 mm with an average diameter size of about 4.5 mm. The diameter of the cylindrical surfaces is about 23 mm. The distance between the center axes of the outlet end segments 65 is about 77–80 mm, and the over-all distance between the outside surfaces of the front and rear sections is about 77–80 mm. The unique evaporable disc brake caliper pattern of the invention thus produces a novel disc brake casting having a minimal over-all size with a minimally sized fluid flow passageway formed within the caliper to achieve optimum fluid compressibility in the finished disc brake. Thus a disk brake with a caliper made in accord with the invention has a most desirable brake pedal firmness and movement for use in any vehicle.

While the disc brake caliper and the evaporable pattern mechanism have been shown and described in detail, it is obvious that this invention is not to be considered as limited to the exact form disclosed, and that changes in detail and construction may be made therein within the scope of the invention without departing from the spirit thereof.

What is claimed is:

1. A disc brake caliper casting comprising:
   a) caliper housing means including a front section, a rear section, and a bridge section extending between said front and rear sections;
   b) said front, rear, and bridge sections form a cast one-piece structural configuration to integrally define an outer shaped surface and an inner shaped surface;
   c) said inner shaped surface including at least one inner cylindrical surface, first cast-in passageway means disposed on a first side of said cylindrical surface, and second cast-in passageway means disposed on an opposed second side of said cylindrical surface;
   d) each said first and second passageway means including a cylinder connecting section having an inner end portion that openly connects to said opposed sides of said cylindrical surface;
   e) each said cylinder connecting section being outwardly directed from said inner cylindrical surface and having an outer end portion that extends to said bridge section;
   f) means for forming a fluid connection section that intersects said cylinder connecting sections to produce a continuous fluid flow path between said front section and said rear section;
   g) said fluid connection section forming means including a bridge portion that extends through said bridge section to intersect each said cylinder connecting section, and an outlet end segment that extends outwardly from the bridge section through an outlet opening in said outer shaped surface.

2. A caliper casting as defined in claim 1 wherein said fluid connection section forming means includes a cast-in fluid connection passageway portion that extends outwardly from each said outer end portion of said cylinder connecting sections across said bridge section and opens outwardly from said outlet end segment.

3. A caliper casting as defined in claim 1 wherein said bridge section includes two bridge end portions each disposed at an outer end of said front and rear sections, said front, rear, and bridge sections each includes an inwardly facing surface that together define a friction brake pad support chamber having torque bearing surfaces that are disposed at opposing ends of the support chamber and are perpendicular to the inwardly facing surfaces of the front and rear sections, and said torque bearing surfaces include disc rotor grooves having a structural configuration that is effective to allow brake disc rotor means to rotate through the friction brake pad support chamber when a brake caliper that is produced from said caliper casting is mounted to a vehicle.

4. A caliper casting as defined in claim 3 wherein said front and rear sections each includes an inner cylindrical surface and an inwardly directed cast-in cylinder connecting section on opposing sides of each said inner cylindrical surface, and each said bridge end portion includes a cast-in fluid connection section extending therethrough with each end thereof intersecting a cast-in cylinder connecting section.

5. A caliper casting as defined in claim 4 wherein said inner cylindrical surfaces are disposed along a single longitudinal center axis that extends through said front and rear sections, and through said friction brake pad support chamber.

6. A caliper casting as defined in claim 1 wherein said front, rear, and bridge sections each includes an inwardly facing surface that together define a friction brake pad support zone having a structural configuration effective to allow brake disc rotor means to rotate between friction brake pads mounted in said support zone when a brake caliper that is produced from said caliper casting is mounted to a vehicle, said fluid connection section forming means includes a cast-in fluid connection passageway portion that extends outwardly from each said outer end portion of said cylinder connecting sections and then extends across said bridge section and opens outwardly from said outlet end segment, said inner cylindrical surface is disposed in said rear section and has a longitudinal center axis that extends from said rear section and through said friction brake pad support zone with said front section including a front opening which is registered with said inner cylindrical surface and said longitudinal center axis, said outlet end segment includes an outlet opening having a longitudinal axis that is parallel to said longitudinal center axis of the inner cylindrical surface whereby any machining may be effected on one side of the casting within the inner cylindrical surface in said rear section, within the registered front opening, and along the longitudinal axis of and within said outlet opening.

7. A caliper casting as defined in claim 1 wherein said bridge section includes two bridge end portions each disposed at an outer end of said front and rear sections, said front, rear, and bridge sections each includes an inwardly facing surface that together define a friction brake pad support chamber around said support zone, said support chamber having torque bearing surfaces that are disposed at opposing ends of the support chamber and are perpendicular to the inwardly facing surfaces of the front and rear sections, said torque bearing surfaces include disc rotor grooves having a structural configuration that is effective to allow brake disc rotor means to rotate through the friction brake pad support chamber when a brake caliper that is produced from said caliper casting is mounted to a vehicle, said front and rear sections each includes an inner cylindrical surface and an inwardly directed cast-in cylinder connecting section located on opposing sides of each said inner cylindrical surface, and each said bridge end portion includes a cast-in fluid connection section extending therethrough with each end thereof intersecting a cast-in cylinder connecting section to produce a fluid flow path.

8. A caliper casting as defined in claim 7 wherein
said outer shaped surface includes friction pad support means for mounting friction brake pad supports within said support chamber, and caliper support means for mounting a machined brake caliper cast housing to a vehicle,
said friction pad support means and said caliper support means each includes a bore opening having a longitudinal axis that is parallel to said longitudinal center axis of the inner cylindrical surface.

9. A caliper casting as defined in claim 7 wherein
said torque bearing surfaces are tapered inwardly and downwardly from a respective bridge end portion with a structural configuration which conforms to the shape of tapered friction brake pad members used in disc brake calipers.

10. A caliper casting as defined in claim 1 wherein
said inner shaped surface includes a pair of inner cylindrical surfaces,
each said first and second cast-in passageway means includes a fluid connection section outwardly directed from each said inner cylindrical surface and having an outlet end that extends openly and outwardly through said outer shaped surface, and
each said first and second cast-in passageway means includes two opposing inwardly directed cylinder connection sections having inner ends that each openly connect to said pair of inner cylindrical surfaces;
said first and second cast-in passageway means being effective to form a continuous fluid flow crossover path from a first open outlet side to a second closed side of the outer shaped surface so that said path extends through said outlet end of each said passageway means, and through said inner ends that openly connect to each said cylindrical surface.

11. A disc brake caliper casting comprising:
a) caliper housing means including a front section, a rear section, and a bridge section extending between said front and rear sections;
b) said front, rear, and bridge sections having a cast one-piece structural configuration to integrally define an outer shaped surface and an inner shaped surface;
c) said front, rear, and bridge sections each includes an inwardly facing surface that together define a friction brake pad support zone for disposing friction brake pad means on opposing sides of disc brake rotor means; and
d) friction pad support means for mounting said friction brake pad means within said brake pad support zone,
e) said inner shaped surface including at least one inner cylindrical surface having a longitudinal center axis, first cast-in passageway means disposed on a first side of said cylindrical surface, and second cast-in passageway means disposed on an opposed second side of said cylindrical surface;
f) each said first and second passageway means including a cylinder connecting section being outwardly directed from said inner cylindrical surface, and each having an inner end portion that openly connects to an opposed side of said cylindrical surface, and an outer end portion that extends to said bridge section;
g) said outer shaped surface including a plurality of drilling surfaces each disposed in a respective plane that extends in a direction perpendicular to said longitudinal center axis of the inner cylindrical surface, and caliper support means for mounting a finished brake caliper produced from said brake caliper casting;
h) said bridge section including a drilling surface so that the bridge section may be drilled into for forming a fluid outlet end portion that connects with a crossover fluid flow path that extends through the passageway means and inner cylindrical surface, and
i) said caliper support means including a drilling surface so that said outer shaped surface may be drilled into for forming bore openings to mount said finished brake caliper to a vehicle.

12. A caliper casting as defined in claim 11 wherein
said friction pad support means including a drilling surface so that the outer shaped surface may be drilled into for forming a bore opening to mount said friction brake pad means in said brake pad support zone.

13. A caliper casting as defined in claim 11 wherein
said inner shaped surface includes a pair of inner cylindrical surfaces,
each said first and second cast-in passageway means includes a fluid connection section which is outwardly directed from each said inner cylindrical surface, and said fluid outlet end portion extends openly and outwardly through said outer shaped surface, and
each said first and second cast-in passageway means includes two opposing inwardly directed cylinder connection sections having inner ends that each openly connect to said pair of inner cylindrical surfaces;
said first and second cast-in passageway means being effective to form a continuous fluid flow crossover path from a first open outlet side to a second closed side of the outer shaped surface so that said path extends through said outlet end of each said passageway means, and through said inner ends that openly connect to each said cylindrical surface.

14. A caliper casting as defined in claim 11 wherein
said bridge section includes two bridge end portions each disposed at an outer end of said front and rear sections,
said front, rear, and bridge sections each includes an inwardly facing surface that together define a friction brake pad support chamber having torque bearing surfaces that are disposed at opposing ends of the support chamber and are perpendicular to the inwardly facing surfaces of the front and rear sections, and
said torque bearing surfaces include disc rotor grooves having a structural configuration that is effective to allow brake disc rotor means to rotate through the friction brake pad support chamber when a brake caliper that is produced from said caliper casting is mounted to a vehicle.

15. A caliper casting as defined in claim 14 wherein
said front and rear sections each includes an inner cylindrical surface and inwardly directed cast-in cylinder connecting sections on opposing sides of each said inner cylindrical surface, and
each said bridge end portion includes a cast-in fluid connection section extending therethrough with each end thereof intersecting a cast-in cylinder connecting section.

16. A caliper casting as defined in claim 15 wherein
said inner cylindrical surfaces are disposed along a single longitudinal center axis that extends through said front and rear sections, and through said friction brake pad support chamber whereby said inner cylindrical surfaces may be machined to form finished brake piston cylinders from the same side of said casting as the drilling surfaces are drilled into.

17. A caliper casting as defined in claim 11 wherein said inner cylindrical surface is disposed in said rear section and has a longitudinal center axis that extends from said rear section and through said friction brake pad support zone with said front section including a front opening which is registered with said inner cylindrical surface and said longitudinal center axis, said outlet end portion includes an outlet opening having a longitudinal axis that is parallel to said longitudinal center axis of the inner cylindrical surface whereby any machining may be effected on one side of the casting within the inner cylindrical surface in said rear section, within the registered front opening, and along said longitudinal axis of and within said outlet opening.

18. A caliper casting as defined in claim 11 wherein said bridge section includes two bridge end portions each disposed at an outer end of said front and rear sections, said front, rear, and bridge sections each include inwardly facing surfaces that define a friction brake pad support chamber around said support zone, said support chamber having torque bearing surfaces that are disposed at opposing ends of the support chamber and are perpendicular to the inwardly facing surfaces of the front and rear sections, said torque bearing surfaces include disc rotor grooves having a structural configuration that is effective to allow brake disc rotor means to rotate through the friction brake pad support chamber when a brake caliper that is produced from said caliper casting is mounted to a vehicle, said front and rear sections each includes an inner cylindrical surface and inwardly directed cast-in cylinder connecting sections on opposing sides of each said inner cylindrical surface, and each said bridge end portion includes a cast-in fluid connection section extending therethrough with each end thereof intersecting a cast-in cylinder connecting section.

19. A caliper casting as defined in claim 18 wherein said torque bearing surfaces are tapered inwardly and downwardly from a respective bridge end portion with a structural configuration which conforms to the shape of tapered friction brake pad members used in disc brake calipers.

\* \* \* \* \*